United States Patent

[11] 3,552,275

| [72] | Inventors | Harold K. Chaney;<br>Halvor T. Strandrud, Seattle, Wash. |
|------|-----------|----------------------------------------------------------|
| [21] | Appl. No. | 763,039 |
| [22] | Filed | July 29, 1968 |
| [45] | Patented | Jan. 5, 1971 |
| [73] | Assignee | The Boeing Company<br>Seattle, Wash.<br>a corporation of Delaware |

[54] ELECTRIC FLUID ACTUATOR
4 Claims, 14 Drawing Figs.

[52] U.S. Cl. .................................................. 91/418,
91/422, 91/431, 137/251
[51] Int. Cl. .................................................. F15b 11/08,
F16k 9/00
[50] Field of Search .......................................... 60/(Inquired);
137/251A, 251, 81.5; 91/47, 48, 51,
419, 422, 431, 418; 192/21.5

[56] References Cited
UNITED STATES PATENTS

| 2,651,258 | 9/1953 | Pierce | 137/251X |
| 2,661,596 | 12/1953 | Winslow | 60/52 |
| 2,692,582 | 10/1954 | Curci et al. | 137/251X |
| 2,820,471 | 1/1958 | Crowell | 137/251 |
| 3,405,728 | 10/1968 | Dexter | 137/251 |

Primary Examiner—Martin P. Schwadron
Assistant Examiner—Irwin C. Cohen
Attorney—Glenn Orlob

ABSTRACT: Electric fluid actuator apparatus utilizing electrically conducting plates with a field control source whereby an electric or magnetic field is established between the plates to control the effective viscosity of fluid located therebetween. Flow of fluid within the actuator mechanism is initiated by constant flow pumps and controlled by the field control source to establish fluid pressures acting to displace the actuator mechanism.

PATENTED JAN 5 1971

INVENTORS
HALVOR T. STRANDRUD
HAROLD K. CHANEY
BY
ATTORNEY

INVENTORS
HALVOR T. STRANDRUD
HAROLD K. CHANEY
BY K. W. Thomas
ATTORNEY

INVENTORS
HALVOR T. STRANDRUD
HAROLD K. CHANEY
BY

ATTORNEY

ELECTRIC FLUID ACTUATOR

This is a divisional application of copending parent application Ser. No. 503,032 filed Oct. 23, 1965 now U.S. Pat. No. 3,416,549, for "Electric Fluid Valve."

This invention relates to means for the control of hydraulic power. More particularly, the invention comprises valves which contain no moving parts and use a special hydraulic fluid which responds to an electrostatic field. Furthermore, the valves are specifically combined for direct control by numerical or digital control signals.

Electrically controlled hydraulic fluid valve means exist in the prior art. The basic electrically controlled hydraulic valve element known in the prior art consists of two electrically conducting surfaces spaced a uniform distance apart which form a passageway through which the electrically sensitive fluid flows, and a source of voltage between the conducting surfaces. The electrically conducting surfaces may be in parallel plane configuration or formed into closed cylinders or other shapes as long as the spacing is maintained essentially constant. Any open edges must be closed in order to confine flow of the fluid between the two surfaces.

The properties of fluids which are controllable by an electric or magnetic field are well known and understood. Such fluids have the property of becoming substantially rigid in the presence of a suitable field. Fluids suitable for the practice of the subject invention may be responsive to electric or magnetic fields, or both. The formulation of such fluids is exemplified by the U.S. Pat. to Willis M. Winslow, No. 2,661,596. The composition or preparation of such fluids does not form a part of this invention. The effect of an applied field manifests itself as an instantaneous and reversible change in the modulus of viscosity of the fluids. In strong fields, the fluid undergoes a dramatic change in shear resistance, and takes on semiplastic or solid physical properties. The applied field is magnetic and induced by the action of electromagnets in the case of magnetic fluids. Where field responsive fluids are used, as is preferred in this invention, an electric potential is applied between the adjacent surfaces which bound the fluid film. Since the fluids themselves are dielectric, the current and power requirements are relatively small.

Prior methods for digital control of hydraulic power have required the use of mechanical servovalve elements which are more complex, expensive, and considerably slower in operation than the subject invention.

An object of the present invention is to provide multiple valve elements hydraulically in series or in parallel, having separate electrical control leads.

Another object of the present invention is to provide a group of valve elements so proportioned as to exhibit pressure drops that are related by integral ratios, or flows that are related by integral ratios.

A further object of the present invention is the control of an assemblage of valves by a group of signals representing discrete numerical values.

The invention is best described with reference to the drawings in which.

Figure 1:
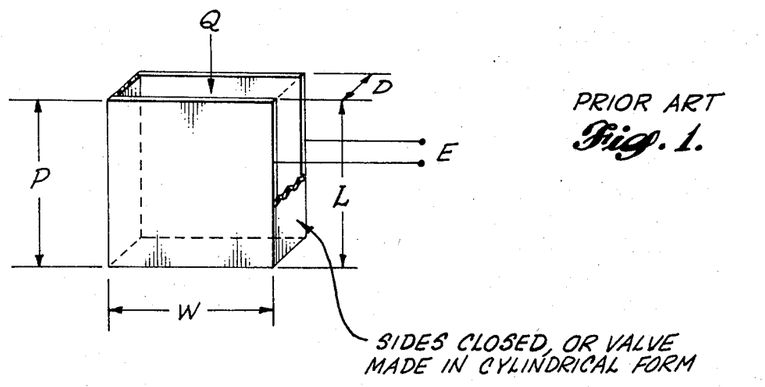
FIG. 1 is a schematic representation of the basic electrically controlled hydraulic valve element well known in the prior art.

Basic relationships relating flow and pressure drop which are pertinent to the teachings of this invention are summarized with reference to FIG. 1. For a given fluid flow, for example, Q gallons per minute, pressure drop P: $a$ increases in direct proportion to length of valve L; $b$ decreases when the width of valve W increases; $c$ decreases when thickness D increases; and $d$ increases when control voltage E increases.

Figure 2:
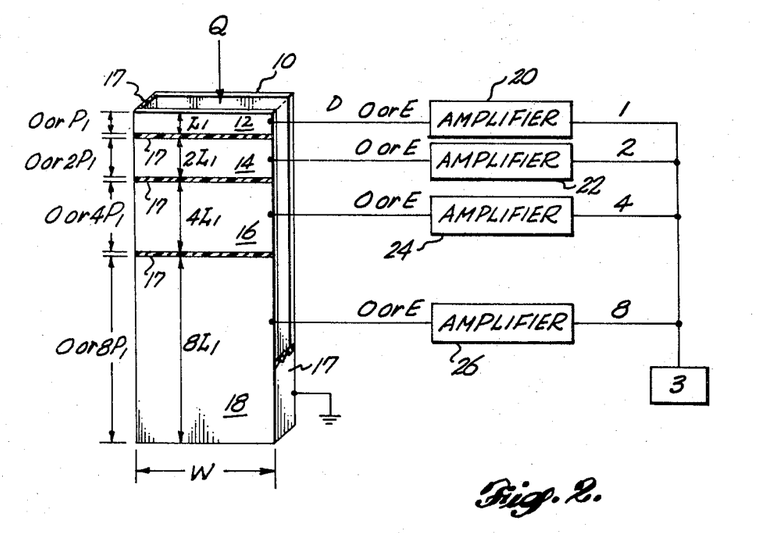
FIG. 2 is a schematic representation of a valve for the control of hydraulic power according to the teachings of this invention.

The basic principles of the numerically controlled hydraulic valve according to the teachings of the instant invention are illustrated by the pressure control valve assembly shown in FIG. 2. Electrically sensitive fluid is caused to flow at some constant rate, for example, Q gallons per minute, through a valve means which unlike the valve of FIG. 1 consists of a number of valves which are hydraulically combined in series. Although four valves are shown here for purposes of illustration, any number can be used, depending upon the specific requirements; the fluid flows between parallel surfaces of what appears to the fluid as two parallel members or plates having closed edges to confine the flow of the fluid. It is to be noted, however, that the instant invention is not restricted to valves formed by parallel plates; on the contrary, the valves may comprise individual cylindrical shells disposed in parallel concentric fashion. The embodiments of FIGS. 2 through 9 can, though discussed in terms of parallel plates, be though of as elemental portions of cylindrical shells.

Continuing with reference to FIG. 2, plate 10, which is electrically grounded, is a conducting member or plate that is common to the four valves. The other electrically conducting members or plates for the four valves are plates, 12, 14, 16 and 18, which are of uniform width W and which are uniformly spaced a distance D from plate 10, but which have lengths in the direction of fluid flow in the ratios 1:2:4:8 as shown. Plates 12, 14, 16 and 18 are insulated from each other and from plate 10 by suitable insulation 17; plates 12, 14, 16 and 18 with plate 10 are so arranged as to form a smooth, continuous passageway for the fluid to flow through.

Plates 12, 14, 16 and 18 are energized through amplifiers 20, 22, 24 and 26, respectively, from lines carrying parallel binary control signals which represent values 1, 2, 4 and 8, respectively, when energized from a binary potential control signal source 3. Depending upon the presence or absence of a control signal on each of the lines carrying parallel binary control signals, either zero volts or some selected voltage E will be applied by the amplifiers 20, 22, 24, and 26 to the respective plates 12, 14, 16, or 18. When zero voltage is applied to any one of the plates, pressure drop across that plate will be small and may be neglected. When some value of voltage E is applied to one or more of plates 12, 14, 16, or 18, pressure drops across the energized plates will be in proportion to plate lengths and will therefore be in the same numerical ratios as the integers representing the energized control lines from amplifiers 20, 22, 24, and 26 to plates 12, 14, 16, and 18, respectively. Total pressure drop across the entire valve assemblage of FIG. 2 is the sum of the pressure drops across the individual valves. Thus, for example, if the control lines energizing plates 12, 14, and 18 are energized simultaneously, the total pressure drop across the valve assemblage will be $P_1 + 2P_1 + 8P_1 = 11P_1$. In general, the total pressure drop will be in proportion to whatever number is represented by the input binary control signals from the signal source 3 to amplifiers 20, 22, 24, and 26.

Use of a binary numbering system for control signals is not essential to the operation of this invention. Input signals can represent any desired numbers depending upon the particular application. Lengths of the plates 12, 14, 16, and 18 would be in proportion to the numbers represented by input signals. Likewise, with reference to the embodiment of FIG. 2, use of amplifiers 20, 22, 24, and 26 is not essential; the amplifiers may be dispensed with if the control signal lines are capable of supplying sufficient power. Additionally, numerical control is achieved by proper proportioning of the lengths of individual valves making up the assemblage. However, as will be seen with reference to FIGS. 3, 4, and 5, any of the other parameters (D, W and E, as seen in FIG. 1) relating fluid flow, Q, to pressure drop, P, may be made the basis for proportioning the several valves making up a numerically controlled assemblage. In addition, any combination of these parameters may be used.

Figure 3:
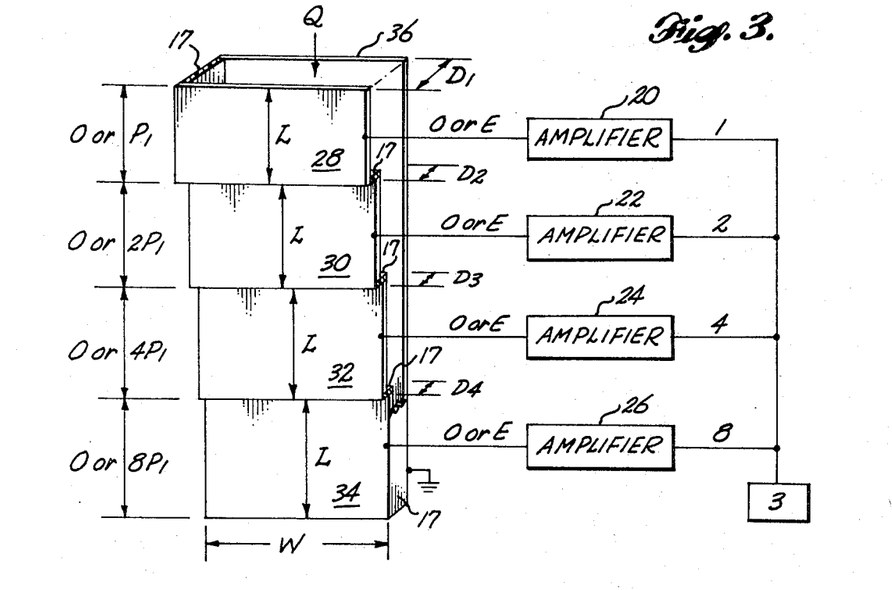
FIG. 3 is another schematic representation of a valve for the control of hydraulic power according to the teachings of this invention.

With reference to FIG. 3, a valve assemblage according to the teachings of this invention is disclosed for the numerical control of pressure in which spacing, D, is varied for the individual valves but parameters, L, W, and E, are the same for all valves. Here members or electrically conducting plates 28, 30, 32, and 34 are of uniform length, L, insulated from one another by insulation 17, but are spaced various distances as shown from grounded plate 36 and separated from plate 36 by insulation 17 such that their pressure drops are related in the ratios 1:2:4:8, respectively. The numerical control of pressure by input binary signals from a source 3 is accomplished by energizing desired combinations of numerical input lines in the same manner as described above in the embodiment of FIG. 2.

Figure 4:
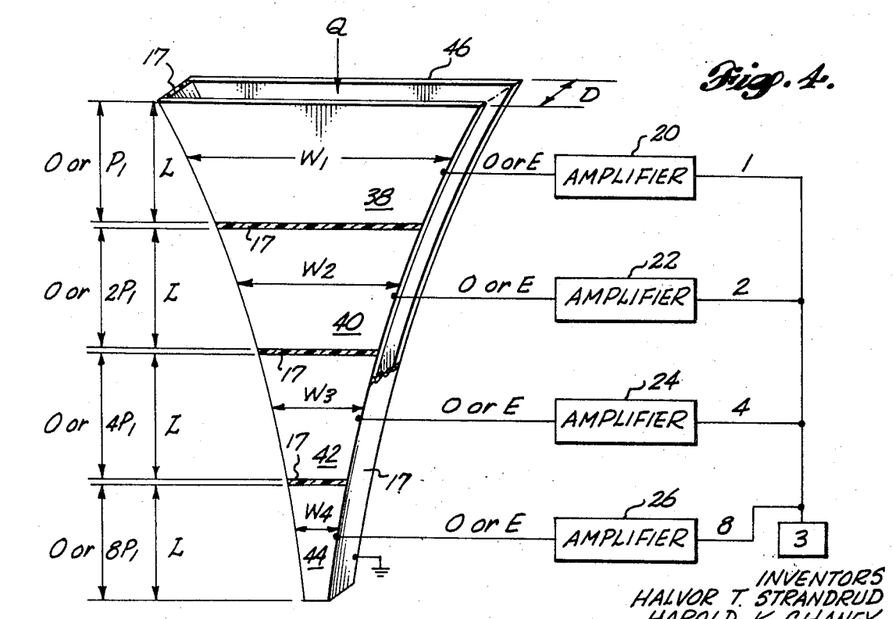
FIG. 4 is still another schematic representation of a valve for the control of hydraulic power according to the teachings of this invention.

FIG. 4 shows a valve assemblage according to the teachings of this invention for a numerical control of pressure in which width, W, is varied for the individual valves, and parameters D, L, and E are the same for all Valves. Here members or electrically conducting plates 38, 40, 42, and 44 are of varying width, $W_1$, $W_2$, $W_3$ and $W_4$, and are spaced an equal distance, D, from grounded plate 46 and are insulated from one another and from plate 46 by insulation 17. The average widths of the various plates are proportioned to produce pressure drops across plates 38, 40, 42 and 44 in the ratios 1:2:4:8, respectively. The numerical control of pressure is accomplished by energizing desired combinations of numerical input lines in the same manner as described above for the configuration shown in FIG. 2.

Figure 5:
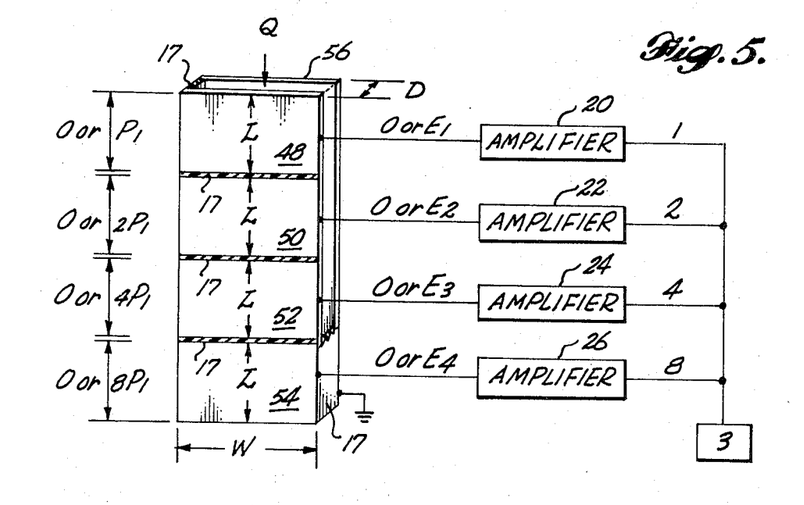
FIG. 5 is a further schematic representation of a valve for the control of hydraulic power according to the teachings of this invention.

In the configuration shown in FIG. 5, the individual valves represented by electrically conducting members or plates 48, 50, 52, and 54, insulated from one another by insulation 17, have identical dimensions L and W and are equally spaced a distance D from electrically conducting plate 56 and insulated from plate 56 by insulation 17. In this embodiment, however, the outputs of the amplifiers 20, 22, 24, and 26 are so adjusted as to produce different output voltages, $E_1$, $E_2$, $E_3$, and $E_4$, respectively. Voltages $E_1$, $E_2$, $E_3$, and $E_4$ are selectively produced by said amplifiers to produce pressure drops in the valves 48, 50, 52, and 54 in the ratios 1:2:4:8, respectively, when input signals are applied to said amplifiers from a binary control source 3. A total pressure drop in proportion to the numerical input is thus realizable in the same manner as described above by energizing desired combinations of the numerical input lines connecting the plates 48, 50, 52, and 54 with amplifiers 20, 22, 24, and 26, respectively.

The embodiments described above with reference to FIGS. 2 through 5 produce a numerically controlled pressure drop through the valve in the direction of flow at a constant flow rate Q. Described below in FIGS. 6 through 9 are embodiments which produce a numerically controlled flow Q when constant pressure is applied. The basic principles discussed above are involved and are similar except that for flow control using the embodiments of FIGS. 6 through 9 the individual valves are hydraulically in parallel instead of in series as is the case with reference to the embodiments of FIGS. 2 through 5.

Figure 6:
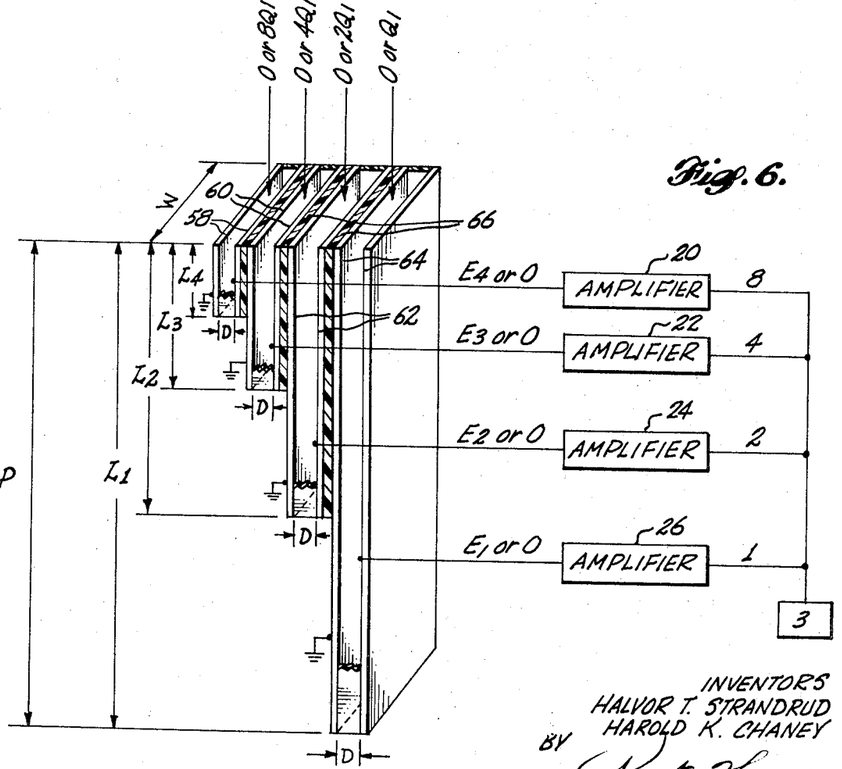
FIG. 6 is another schematic representation of a valve for the control of hydraulic power according to the teachings of this invention.

FIG. 6 shows a valve assemblage for the numerical control of flow Q in which four separate valves are shown for illustration, although any desired number can be used to meet specific requirements. By means of suitable ducts or manifolds (not shown), electrically sensitive fluid is led to the top of the embodiment of FIG. 6 (as shown) and is collected from the several valves and led away from the bottom of the embodiment of FIG. 6 as shown. A constant pressure P in p.s.i. is maintained across the embodiment as shown.

Continuing with reference to FIG. 6, one electrical conducting member or plate of each of the valves 58, 60, 62 and 64 is at ground. The ungrounded plate of each of the valves 58, 60, 62 and 64 is connected to an amplifier 20, 22, 24 and 26, respectively. Where appropriate, each of said plates at ground are insulated from each of said plates connected to an amplifier by any suitable insulating means 66. Each of said amplifiers is energized from one of a set of numerical control lines from a binary potential control signal source 3. Here the presence of a voltage on any one of the numerical control lines 8, 4, 2, or 1 represents a zero for that particular line; absence of a voltage represents a digit 8, 4, 2, or 1, respectively, as will be explained below.

All of the valves of FIG. 6 have the same plate width W and the same plate spacing D as shown. Length $L_4$, $L_3$, $L_2$ and $L_1$ are so chosen that when the valves 58, 60, 62 and 64 are deenergized, the quantity of fluid flow through the valves will be in the proportions $8Q_1 : 4Q_1 : 2Q_1 : 1Q_1$, respectively. Output voltages $E_4$, $E_3$, $E_2$ and $E_1$ of the amplifiers 20, 22, 24 and 26, respectively, are sufficient to effectively stop the flow Q of fluid in the respective valves 58, 60, 62 and 64 when the individual associated control lines are energized. Thus, for example, absence of a signal on control line 8 (the control line leading to amplifier 20) results in zero output voltage from amplifier 20 and allows a flow of $8Q_1$ through valve 58, as shown in FIG. 6. Total flow through the assemblage will thus be in proportion to the sum of the integers represented by the deenergized control signal lines 8, 4, 2 and 1.

As in the case of the digital pressure control configurations, FIGS. 3, 4 and 5, digital flow control valves can be built based on varying thickness D, varying width W, and varying voltage E, or any combination of these parameters.

Figures 7, 8, 9:
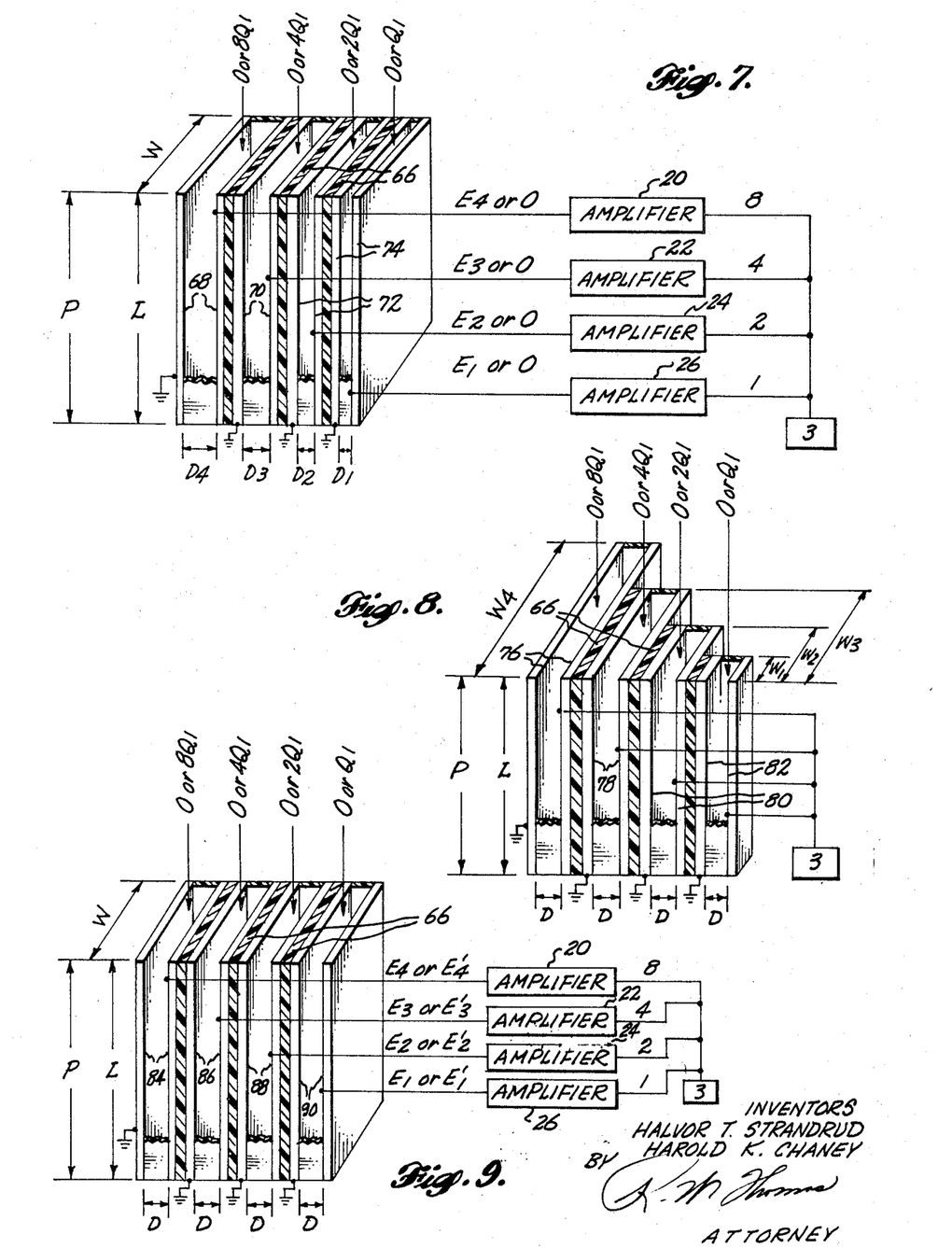
FIG. 7 is a schematic representation of a valve for the control of hydraulic power according to the teachings of this invention.
FIG. 8 is a seventh schematic representation of a valve for the control of hydraulic power according to the teachings of this invention.
FIG. 9 is still another schematic representation of a valve for the control of hydraulic power according to the teachings of this invention.

FIG. 7 shows a numerical flow control valve assemblage in which the individual component valves 68, 70, 72 and 74 have different member or plate spacings, $D_4$, $D_3$, $D_2$ and $D_1$, respectively. Electrical control means are the same in FIG. 7 as in FIG. 6. In the embodiment of FIG. 7, insulating means 66 are again used as shown. In the embodiment of FIG. 7, pressure drop P does not vary and the length L and width W of the individual valves are equal.

The distances $D_4$, $D_3$, $D_2$ and $D_1$ are so chosen that when the valves 68, 70, 72 and 74 are deenergized, the quantity of fluid flow Q will be in the proportion 8:4:2:1, as shown, respectively. Output voltages $E_4$, $E_3$, $E_2$ and $E_1$ imposed upon each of the valves 68, 70, 72 and 74 by amplifiers 20, 22, 24 and 26, respectively, as was the case with reference to FIG. 6, are sufficient to effectively stop the flow of fluid in the respective valves when the individual associated control lines 8, 4, 2, and 1 are energized. Thus, for example, absence of a signal to valve 68 results in zero output voltage from the amplifier 20 associated with valve 68 as in FIG. 6 and allows a flow of $8Q_1$ through valve 68 as shown in FIG. 7. Presence of a signal on control line 8 will result in zero flow through valve 68. Total flow through the valve assemblage of FIG. 7 will thus be in proportion to the sum of the integers represented by the deenergized control signal lines.

In FIG. 8, the width W varies for individual valves while length L and spacing D are uniform. Insulation means 66 is disposed as in FIGS. 6 and 7 and again electrical control arrangements are the same as in FIG. 6. Pressure drop P and fluid flow Q in gallons per minute through valves 76, 78, 80 and 82 are effected in the same proportions as was the case with reference to FIGS. 6 and 7.

In the arrangement shown in FIG. 9, the valves 84, 86, 88 and 90 of the assemblage as shown have the same dimensions length L, width W, and are uniformly spaced by an amount D. Presence of a signal on one of the numerical input lines 8, 4, 2 and/or 1 from binary potential control signal source 3 produces a voltage $E_4$, $E_3$, $E_2$ and/or $E_1$, respectively, which stops flow of fluid in the respective valve. As shown in FIG. 9, output voltages $E_4{}^1$, $E_3{}^1$, $E_2{}^1$ and $E_1{}^1$, respectively, are so proportioned as to produce flows $8Q_1$, $4Q_1$, $2Q_1$ and $Q_1$, respectively, through the respective individual valves 84, 86, 88 and 90. Output voltages $E_4$, $E_3$, $E_2$ and $E_1$, respectively, produce zero flow through the respective individual valves 84, 86, 88 and 90.

In each of the above embodiments, FIGS. 2 through 9, only one parameter L, D, W, or E is varied in each FIG. for simplicity of explanation. This restriction not essential to the operation of this invention. In a valve assemblage for the numerical control of pressure, any or all of the parameters, L, D, W or E may be varied from one valve to another, as long as the pressure drop across each valve (when energized) is in proportion to the numerical value of the associated control line. Similarly, in a valve assemblage for the numerical control of flow, any or all of the parameters L, D, W or E may be varied from one valve to another as long as the flow through each valve (when deenergized) is in po proportion to the numerical value of the associated control line.

Figure 10:
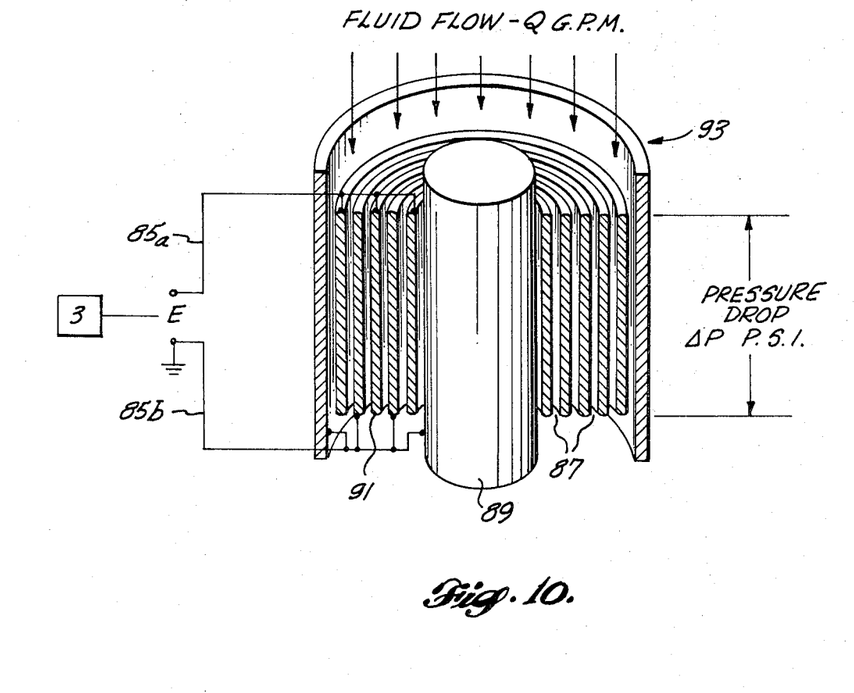
FIG. 10 is an isometric view of a valve for the control of hydraulic power according to the teachings of this invention.

In the arrangement shown in FIG. 10, a plurality of members, viz, cylindrical shells 91, are nested parallel to an and concentrically about one another between an output shaft 89 and a casing 93 to form a group of parallel gaps 87 having uniform spacing. The shells 91 are supported (by means not shown) in such manner as suitable for a particular embodiment, e.g., within and to casing 93 thereby being prevented from axial or radial displacement, or within casing 93 but attached to shaft 89 so as to reciprocate with shaft 89 and operate as a piston. A control voltage E (which can be regulated by a control source 3) is applied by leads 85a to alternate shells 91. The other shells 91 are electrically placed at a different and uniform potential (e.g., ground) through leads 85b, as are shaft 89 and casing 93. A field is thus established across each of the gaps 87 whenever a voltage E is present in leads 85a. As the field is established, fluid flow through gaps 87 is prevented; the force of the fluid against shaft 89 and, when shells 91 are attached to shaft 89, against the piston formed by shells 91 will thus provide an axial displacement of shaft 89; i.e., an output. Removal of the field again allows flow through gaps 87, thus allowing shaft 89 to return to equilibrium as will be discussed more fully below.

With reference to FIGS. 11 through 14, various practical applications of the valves as considered in FIGS. 2 through 10 are disposed for operation. It is to be understood that the embodiments represented in FIGS. 11 through 14 are illustrations or applications in a nonlimiting sense. More particularly, the valves in FIGS. 11 through 14 comprise individual members or cylindrical shells disposed in parallel concentric fashion and having uniform spacing between individual shells, each shell being of uniform length L with respect to each other concentric shell. For purposes of illustration, there are no amplifiers or numerically controlled variations in energizing voltage E as was the case in FIGS. 2 through 9; on the contrary, a single voltage E is used for purposes of illustration, as was the case in the embodiment of FIG. 10. Numerical controlled variations of voltage E can be used where desired, however, according to the teachings of this invention.

Figure 11:
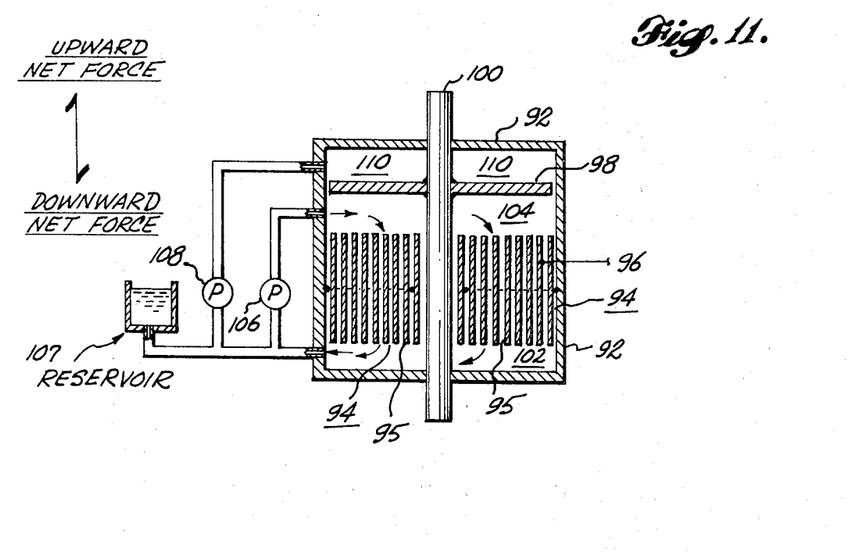
FIG. 11 is a schematic representation of an electric fluid actuator incorporating a valve arrangement according to the teachings of this invention.

Referring to FIG. 11, a single valve electric fluid actuator is shown schematically and in cross section. The embodiments shown in FIGS. 11 through 14 provide applications utilizing the electric field sensitive hydraulic fluid to produce an output force related to input electrical signals. With particular reference to the embodiment of FIG. 11, the actuator has many desirable characteristics: it is small in size, has few parts, and is extremely lightweight. In particular, the weight of the moving parts can be made relatively light to increase the performance capability of the embodiment in applications where fast response is needed (for example, high speed automatic control). Further, no electric power is required by the moving parts, thus eliminating the need for moving contacts or flexible wiring to the moving parts. The piston and rod assembly is more rigid (as well as lighter), facilitating the elimination of undesirable mechanical resonances to thereby increase the useful range of operating frequencies. Still further, an advantage resides in the reduction of electric power requirements needed to provide operation of the embodiment application described with reference to FIG. 11.

The subject device combines valve and actuator functions into one assembly as shown in FIG. 11. A cylindrical housing 92 of any convenient rigid material provides a pressurized container for the electric fluid (not shown). Mounted within housing 92 and attached to the housing by any suitable mechanical means (not shown) is a valve 94 comprising a group of members or cylinders 95 disposed in parallel concentric relationship and uniformly spaced and electrically insulated (by means not shown) from one another. Alternate cylinders 95 are connected to an electric power lead 96; the remaining cylinders 95 are at ground.

Mounted within housing 92 and disposed to reciprocate axially is an assemblage comprising a member or piston 98 rigidly mounted on a member or output shaft 100. Seals (not shown) are provided to prevent fluid leakage between piston 98 and housing 92, and to prevent fluid leakage where output shaft 100 passes through the ends of housing 92. Connected between exhaust pressure chamber 102 and chamber 104 is a constant flow-type pump 106 which circulates the electric fluid at a constant flow rate through valve 94. When voltage on electric power lead 96 is zero, pressure drop across valve 94 is small, and negligible pressure is exerted against the lower face of piston 98. When a voltage is applied to lead 96, the resulting voltage gradient between cylinders 95 of valve 94 impedes the fluid flow through valve 94. Since the flow of pump 106 is constant, pressure then builds within chamber 104 exerting an upward force upon piston 98.

A constant pressure pump 108 maintains a constant pressure between exhaust chamber 102 and chamber 110, producing a constant downward force upon piston 98. Pump 108 is so constructed (by basic design, including an accumulator, a suitable spring loaded check valve, etc., the details of which are not shown) as to allow fluid flow in either direction, while maintaining constant pressure in chamber 110. Either upward or downward net force is produced upon piston 98 by applying suitable voltages to electric power lead 96. When pressure in chamber 104 exceeds pressure in chamber 110, the net force is upward; when pressure in chamber 104 is lower than pressure in chamber 110, the net force is downward. Bidirectional motion of piston 98 is thus controlled by applying a suitable voltage wave shape to lead 96. Voltages of any wave shape may be used which effect the desired result. A reservoir 107 provides a storage and continuous source of fluid to be pumped by pumps 106 and 108.

Action of the embodiment as shown in FIG. 11 is not dependent upon the particular cylinder or plate 95 configuration described with reference to the valve 94. Any configuration may be used which provides suitable flow spaces across which control voltages can be applied; for example, the embodiments described in FIGS. 2 through 10 of this invention.

A feature of this invention is provision of an approximately constant downward force upon the piston 98. Various alternate methods may be used to provide the constant force as described below: (1) separate reservoirs may be used for pumps 106 and 108 which would permit use of standard hydraulic fluid in pump 108 instead of the more costly electric field sensitive fluid; (2) pump 108 may be eliminated and constant pressure maintained in chamber 110 by connecting a charged hydraulic accumulator (not shown) to the chamber 110; use of standard hydraulic fluid or of electrically sensitive hydraulic fluid in pressure chamber 110 is optional in such a configuration; (3) pump 108 may be eliminated and chamber 110 may be pressurized by means of a suitable pressure reducer (not shown) connected to the output of pump 106, either with or without an associated hydraulic accumulator (not shown) at chamber 110; (4fluid pressure may be omitted from chamber 110 and the constant downward force on the piston 98 may be obtained through use of a suitable spring (not shown); (5) chamber 110 may be omitted and the piston replaced by flexible bellows (not shown) which would be attached to the housing 92 and to the output shaft 100. The bellows would serve the multiple functions of sealing the end of housing 92, developing a force from the pressure in chamber 104 and transmitting the force to the output shaft 100 and providing the required constant downward force on output shaft 100.

Each of these variations which could be made on the embodiment of FIG. 11 has its own area of application. For example, if long stroke is required, the embodiment of FIG. 11 itself and alternate 1 are advantageous; for short stroke and simplest construction, alternates 4 and 5 are advantageous; and where the volume of electrically sensitive fluid must be minimized, alternates 1, 2, 4, or 5 are advantageous.

Figure 12:
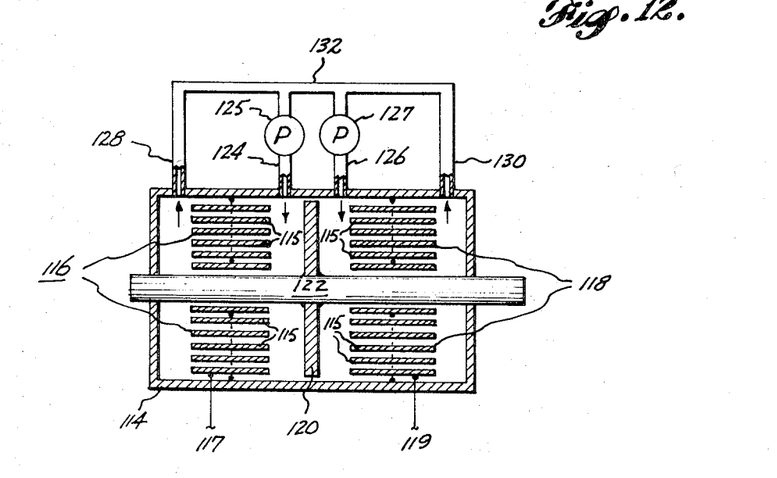
FIG. 12 is a schematic representation of an electric fluid actuator incorporating two valves according to the teachings of this invention.

Referring to FIG. 12, a two valve electric fluid actuator is shown schematically and in cross section according to the teachings of this invention. The device combines valve and actuator functions into one assembly as shown. A cylindrical housing 114 provides a pressurized container for the electric fluid. The housing is conveniently made of any strong rigid material. Mounted within housing 114 and attached to the housing are valves 116 and 118, each consisting of a group of cylinders 115 with adjacent cylinders 115 spaced and electrically insulated (by means not shown) from one another. Alternate cylinders 115 of valve 116 are connected to lead 117, and alternate cylinders 115 of valve 118 are connected to electrical lead 119. All valve cylinders 115 not connected to either voltage supply lead 117 or 119 are connected to ground (by means not shown).

Mounted inside housing 114 and s disposed to reciprocate axially is an assemblage consisting of a member or piston 120 rigidly mounted on a member or output shaft 122. Seals (not shown) are provided to prevent leakage of fluid between piston 120, housing 114, and to prevent fluid leakage where output shaft 122 passes through the ends of housing 114.

Connected to housing 114 are fluid inlet lines 124 and 126 which receive fluid from pumps 125 and 127, respectively; and fluid exhaust lines 128 and 130 through which fluid returns to the respective pumps. The pressure equalizing line 132 equalizes pressures in the chambers at the two ends of housing 114. Pumps 125 and 127 are of the fixed displacement type, delivering constant flow.

Pump 125 circulates fluid through valve 116 at a constant rate. When voltage at lead 117 is zero, pressure drop across valve 116 is small, and negligible pressure is exerted against the left face of piston 120. When a voltage is applied at lead 117 the resulting voltage gradient between valve cylinders 115 of valve 116 impedes the fluid flow therethrough. Since the pump flow is constant, pressure then builds up in the chamber at the left of piston 120 as shown, driving the piston to the right as shown. Similarly, application of voltage to lead 119 produces a pressure in the chamber at the right of piston 120 as shown, driving the piston 120 to the left as shown. Motion of piston 120 is thereby controlled by applying suitable voltage wave shapes to leads 117 and 119. Voltages of any wave shape and amplitude may be used as long as they are of sufficient magnitude to effect the desired result.

Action of the device as shown in FIG. 12 is not dependent on the particular cylinder 115 configuration described for valve 116 and 118. Any configuration may be used which provides suitable flow spaces across which the control voltage through leads 117 and/or 119 can be applied.

Figure 13:
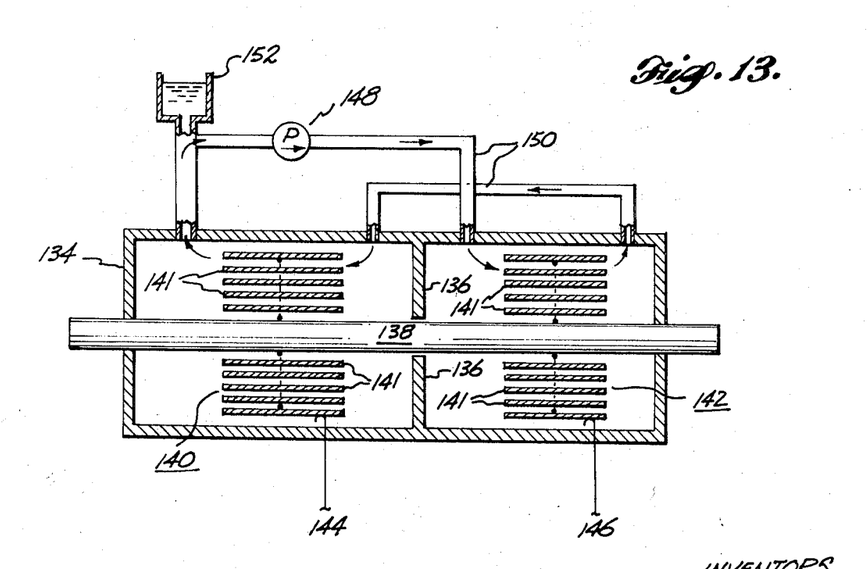
FIG. 13 is a second embodiment of the schematic representation shown in FIG. 11.

FIG. 13 represents a second configuration of a two valve electric fluid actuator according to the teachings of this invention. FIG. 13 discloses a configuration of a fluid actuator having the advantage of requiring only a single pump. Housing 134 is a cylindrical pressure tight container comprising any suitable rigid material which is divided into two parts by a member or bulkhead 136. A member or output shaft 138 is disposed to reciprocate axially, and is provided with seals (not shown) to prevent fluid leakage at the ends of housing 134 and at the bulkhead 136.

Attached to shaft 138 are valves 140 and 142, each consisting of a group of cylinders 141 each of which are uniformly spaced from one another and electrically insulated (by means not shown) from one another. Alternate cylinders 141 of valve 140 are connected to a voltage source lead 144, and alternate cylinders 141 of valve 142 are connected to voltage source lead 146. All valve cylinders 141 not so connected to either of the voltage supply leads are connected to ground.

A pump 148, a fixed displacement pump, circulates electric fluid (not shown) at a constant rate of flow through connecting tubing 150 and through the actuator chambers and valves as shown by the arrows of FIG. 13. The essential feature of this arrangement is that the fluid flows from right to left as shown by arrows through valve 140, and from left to right as shown through valve 142. A reservoir 152 maintains a constant fluid supply at pump 148.

When the potential supplied by leads 144 and 146 equals zero, the pressure drop across valves 140 and 142 is small, and a negligible force is transmitted to the output shaft 138. If a voltage is applied to lead 144, the resulting voltage gradient between the cylinders 141 of valve 140 impedes the flow of fluid through valve 140, producing a force towards the left on output shaft 138 as shown. Similarly, application of a voltage to lead 146 impedes the flow of fluid from left to right through valve 142 as shown and produces a force towards the right on output shaft 138 as shown.

Motion of output shaft 138 is thus controlled by applying suitable voltage wave shapes to leads 144 and 146. Voltages of any wave shape and amplitude may be used so long as they are of sufficient magnitude to effect the desired result. Action of the embodiment of FIG. 12 is not dependent upon the cylinder 141 configuration described for valves 140 and 142. Any configuration may be used which provides suitable flow spaces across which the control voltage can be applied as, for example, the valves of FIGS. 2 through 9.

Figure 14:
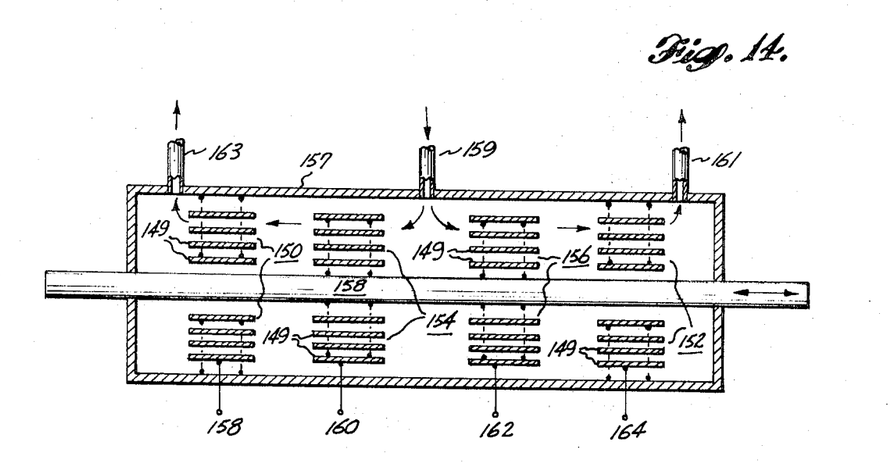
FIG. 14 is a schematic representation of an electric fluid actuator wherein multiple valves are used according to the teachings of this invention.

Referring to FIG. 14, the group of cylinders 149 which form valves 150, 152, 154 and 156 are insulated (by means not shown) and spaced one from the other. Fluid flows axially through the spaces and when adjacent cylinders 149 are given a potential across them, an electric field is formed in the space and applied to the fluid. The electric field reduces or stops the fluid flow (a valving action) and the valves 154 and 156 then act as a piston to apply any developed force and motion to the member or output shaft 158. The four groups of cylinders 149 form the valves 150, 152, 154 and 156 and, in effect, a member or piston disposed to transmit a force to shaft 158. Valves 150 and 152 are attached to a housing 157, and valves 154 and 156 are attached to the output shaft 158 which is disposed for reciprocal axial motion. The output shaft 158 and attached valves 154 and 156 are the only movable parts in the assembly. Electrical connections to the valves 150, 152, 154 and 156 are made through terminals 158, 160, 162 and 164.

Operation of the electric fluid actuator of FIG. 14 is as follows. Electric fluid flows into the housing 157 through a port 159, passes through the valves 156 and 152 and exits through a port 161. Electric fluid also flows into the housing 157 through the port 159, and passes through valves 154 and 150 and exits through port 163. When a voltage is applied to valves 150 and 156 so that no fluid will flow through them, valve 156 which is attached to output shaft 158 will be subjected to supply pressure and fluid flow from port 159 thus producing a force on the output shaft 158 to move it to the right as shown in FIG. 14. No fluid escapes from port 163 because valve 150 has been energized and thereby closed. As the output shaft 158 and "valve piston" 156 move, the displaced fluid moves freely through valve 152 and exhaust port 161. To produce motion and force in the opposite direction, the voltage is removed from valves 150 and 156 and applied to valves 154 and 152. Valve 154, now closed, acts as a piston on output shaft 158 and the force developed by the supply pressure will move the output shaft 158 158 the left as shown in FIG. 14. By the application of DC and/or AC control voltages to the two sets of valves 150, 156 and 154, 152 alternately or in combination, the embodiment can be controlled as a function of its position, velocity or force, or related combinations. Voltage of any wave shape and amplitude may be used so long as they are of sufficient magnitude to effect the desired result.

Voltage is applied to valves 150 and 152 by means of fixed electrodes 158 and 164 and to valves 154 and 156 by means of electrodes (sliding contacts) 160 and 162, respectively. Operation is not restricted to this method of voltage application nor does it depend upon this method. Any suitable method may be used to apply voltages to the valves and is not restricted to the fixed electrodes on valves 150 and 152, nor the sliding contacts 160, 162 on valves 154 and 156, respectively.

The valves of the electric fluid actuator of FIG. 14 may be made of members such as cylinders or plates according to the teachings of the embodiments in FIGS. 2 through 10 and may be arranged in any configuration which permits the fluid through the elements either in the path indicated in FIG. 14 or the reverse direction of this flow.

Since numerous changes may be made in the above apparatus, and different embodiments may be made without departing from the spirit thereof, it is intended that all matter contained in the foregoing description referring to apparatus or shown in the accompanying drawings shall be interpreted as illustrative and not in a limiting sense.

We claim:
1. A dielectric fluid actuator apparatus comprising:
a housing enclosing a chamber, said housing defining a longitudinal axis and equipped with two end walls;
reciprocating output means extending exteriorly of said housing and mounted for longitudinal movement within said chamber;
an external source of dielectric fluid;
valve means carried by said output means and located within said chamber comprising:
 a plurality of electrically conducting members arranged in radially spaced relationship to one another about said longitudinal axis,
 means for applying electrical potential across said members to thereby change the effective viscosity of fluid located between said members,
external means for delivering fluid under pressure to said chamber between said valve means and one of said two end walls;
means for exhausting fluid from said chamber between said valve means and the other of said two end walls; and
wherein the flow of said dielectric fluid through said valve means can be controlled to impart a predetermined force to said output means in a longitudinal direction.
2. Apparatus according to claim 1 which includes a plurality of said valve means and said housing includes an intermediate wall dividing said chamber into two portions.
3. Apparatus according to claim 1 which further includes flow control means for controlling flow of said dielectric fluid within said chamber between said valve means and said means for exhausting fluid from said chamber.
4. Apparatus according to claim 3 wherein said flow control means comprises: a plurality of electrically conducting members arranged in spaced relationship to one another and means for applying electrical potential across said members to thereby change the effective viscosity of fluid located between said members.